W. T. GRAFTON.
MEAL CABINET.
APPLICATION FILED APR. 12, 1909.

937,067.

Patented Oct. 19, 1909.

Witnesses
M. Siebler
C. M. Theobald

W. T. Grafton
Inventor

By R. J. McCarty
his Attorney

UNITED STATES PATENT OFFICE.

WALTER T. GRAFTON, OF DAYTON, OHIO.

MEAL-CABINET.

937,067.  Specification of Letters Patent.  Patented Oct. 19, 1909.

Application filed April 12, 1909. Serial No. 489,375.

*To all whom it may concern:*

Be it known that I, WALTER T. GRAFTON, a citizen of the United States, residing at Dayton, in the county of Montgomery and State of Ohio, have invented certain new and useful Improvements in Meal-Cabinets; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in meal cabinets for transporting hot meals from a caterer's establishment to places where they are partaken of, such for example, as offices, factories and elsewhere within near or remote distances from said establishment. The said cabinets are designed to be used in connection with a caterer's delivery wagon and the meal in each receptacle is maintained in a heated condition for the necessary time from its preparation until consumed.

The object of the invention is to provide a portable cabinet with a series of supports on the interior thereof which contain a suitable number of individual meal receptacles, with a hot water receptacle in the base and suitable space between and around the meal receptacles to permit the heat generated from the hot water vessel to circulate freely there-around, also means for holding each individual meal receptacle in a firm position during the transportation of the cabinet, all as hereinafter more fully described in the specification and set forth in the claim.

Figure 1:
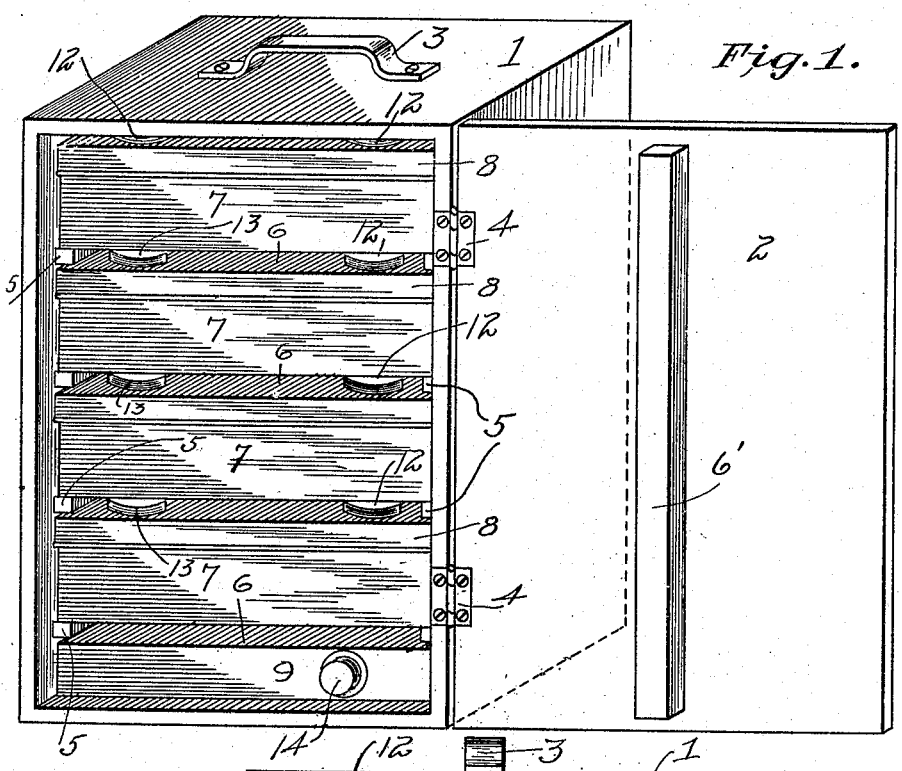
Figure 2:
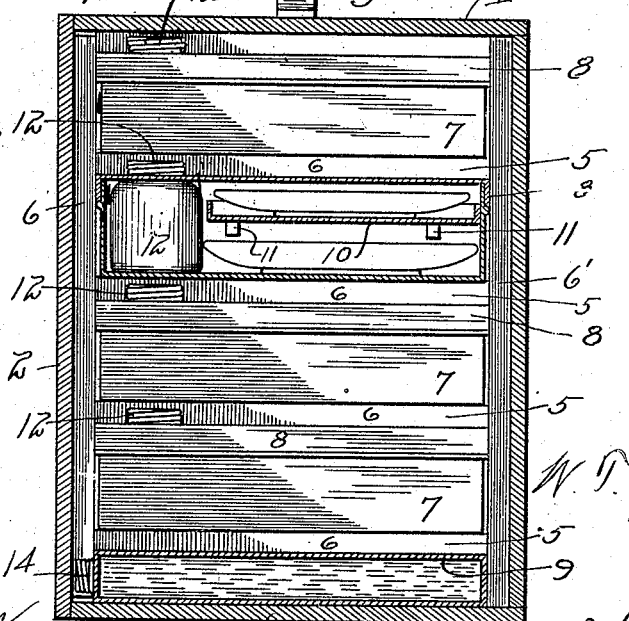

In the accompanying drawings, Figure 1, is a perspective view of the cabinet with the door thrown open to reveal the arrangement and positions of the individual meal receptacles. Fig. 2, is a vertical sectional view at right angles to Fig. 1.

In a detail description of the invention, similar reference characters indicate corresponding parts.

The portable cabinet 1 is preferably constructed of wood owing to its non-heat conducting nature and is of the upright form provided with a door 2 hinged to the cabinet at 4 and provided with a handle 3 by which it is carried to and from the vehicle. On the interior sides of the cabinet, there are a suitable number of supporting cleats 5 arranged at points to permit of desirable spaces 6 above and below each of the individual meal receptacles 7 which are supported on said cleats. The individual meal receptacles 7 are constructed of metal, such for example, as block tin, and each is provided with a lid 8 which incloses the same after the meal has been placed therein. These receptacles 7 are all of uniform size, each being designed to contain a complete meal, such as one is accustomed to have served him at the usual restaurant. On the interior of each receptacle, there is a removable tray 10 supported on brackets 11 on opposite sides of the receptacle and upon which tray the plate containing a portion of the edibles may be placed as well as other accessories necessary for a complete meal. Below this tray there is suitable space provided for a platter and other accessories. In the drawings, it has not been deemed necessary to illustrate everything which may be conveniently placed in each receptacle, but it will be understood that each of such receptacles contains a complete meal including a bottle or jar 12 which may contain drink, such as coffee, tea, etc., and another jar 13 which may contain milk, soup, etc. The regulation size of jars 12 is such that an opening is provided in the lids 8 as at 12 for the necks of said jars to extend through into the spaces 6 between said receptacles. The said spaces 6 therefore, have the double purpose of providing room for the necks of the jars to extend into and also space for the circulation of heat.

The individual receptacles 7 are of substantially less depth than the depth of the cabinet 1, as shown in Fig. 2, and in order to hold said receptacles firmly in position against any sliding movement on their supports 5, a rib 6' is provided on the inner side of the door 2 and a similar strip 6' on the inner side of the back of the cabinet. When the door 2 is closed, the receptacles are held between these front and rear strips or ribs 6' and are thus prevented from sliding laterally on their supports 5. In the bottom of the cabinet, there is a receptacle 9 preferably constructed of block tin and inclosed on all sides. This receptacle 9 has an opening in the front thereof which is closed by a screw-cap 14 which may be removed and replaced, said receptacle being designed to contain hot water which is placed therein in filling the cabinet with the individual meal receptacles.

In supplying each cabinet with the meal receptacles, the hot water receptacle is first placed in the bottom thereof, after which the individual meal receptacles are taken from a steam-heated table upon which they have been placed after being supplied with the meals, and the cabinet is thus filled with hot food, in which condition, it is maintained for several hours thereafter, and each receptacle is removed in serving the customers in their offices, residences, or elsewhere.

I claim:

An upright cabinet provided with a door, and having on its inner sides two series of cleats, the cleats on one side being in alinement with those on the other side, and each two of said alined cleats being adapted to support an individual meal receptacle, the positions of said cleats being such as to provide heat-circulating spaces above and below each receptacle, the depth of the cabinet being greater than the depths of the individual meal receptacles so as to permit the circulation of heat at the rear and front of said receptacles, said cabinet having a space below the lower set of cleats in which to place a hot water receptacle, and the back of the cabinet and the door thereof having each a vertical rib on the inner side thereof and extending approximately the length thereof and adapted to engage the front and rear sides of said receptacles to hold them firmly in transporting the cabinet.

In testimony whereof I affix my signature, in presence of two witnesses.

WALTER T. GRAFTON.

Witnesses:
R. J. McCARTY,
MATTHEW SIEBLER.